United States Patent
Coughlan et al.

(10) Patent No.: US 7,962,342 B1
(45) Date of Patent: Jun. 14, 2011

(54) DYNAMIC USER INTERFACE FOR THE TEMPORARILY IMPAIRED BASED ON AUTOMATIC ANALYSIS FOR SPEECH PATTERNS

(75) Inventors: Marc Coughlan, Sydney (AU); Alexander Forbes, Westleigh (AU); Ciaran Gannon, Sydney (AU); Peter D. Runcie, Bilgola Plateau (AU); Alexander Scholte, Phegans Bay (AU)

(73) Assignee: Avaya Inc., Basking Ridge, NJ (US)

( * ) Notice: Subject to any disclaimer, the term of this patent is extended or adjusted under 35 U.S.C. 154(b) by 1303 days.

(21) Appl. No.: 11/508,442

(22) Filed: Aug. 22, 2006

(51) Int. Cl.
- G10L 21/00 (2006.01)
- G10L 17/00 (2006.01)
- G10L 15/00 (2006.01)
- G10L 15/02 (2006.01)
- H04M 3/42 (2006.01)
- H04M 3/424 (2006.01)
- H04R 29/00 (2006.01)
- H04M 3/428 (2006.01)

(52) U.S. Cl. ............ 704/270.1; 704/231; 704/246; 704/270; 379/201.01; 379/201.12; 379/207.02; 381/56

(58) Field of Classification Search .......... 704/231, 704/246–257, 270–275, E17.001–E17.016, 704/E15.001–E15.05, E19.001–E19.002, 704/E11.001–E11.003; 379/201.01–201.02, 379/201.12, 207.02, 208.01, 250–286, 399.01–413.04; 381/56, 110

See application file for complete search history.

(56) References Cited

U.S. PATENT DOCUMENTS

| | | | |
|---|---|---|---|
| 4,156,423 A | 5/1979 | Friedman et al. | |
| 4,468,804 A | 8/1984 | Kates et al. | |
| 4,696,039 A | 9/1987 | Doddington | |
| 4,838,275 A | 6/1989 | Lee | |
| 4,852,170 A | 7/1989 | Bordeaux | |
| 5,018,200 A | 5/1991 | Ozawa | |
| 5,206,903 A | 4/1993 | Kohler et al. | |
| 5,583,969 A | 12/1996 | Yoshizumi et al. | |
| 5,594,638 A * | 1/1997 | Iliff | 705/3 |
| 5,634,086 A | 5/1997 | Rtischev et al. | |
| 5,644,680 A | 7/1997 | Bielby et al. | |
| 5,684,872 A | 11/1997 | Flockhart et al. | |
| 5,722,418 A | 3/1998 | Bro | |
| 5,796,948 A | 8/1998 | Cohen | |
| 5,802,149 A | 9/1998 | Hanson | |
| 5,828,747 A | 10/1998 | Fisher et al. | |
| 5,868,135 A | 2/1999 | Kaufman et al. | |
| 5,905,793 A | 5/1999 | Flockhart et al. | |

(Continued)

FOREIGN PATENT DOCUMENTS

CA    1333425    12/1994

(Continued)

OTHER PUBLICATIONS

McCarthy, Caroline. "New cell phone to prevent drunk dialing." CNET News. Jun. 28, 2006. Accessed online Mar. 19, 2010. <http://news.cnet.com/8301-10784_3-6088879-7.html>.*

(Continued)

*Primary Examiner* — James S Wozniak
*Assistant Examiner* — David Kovacek
(74) *Attorney, Agent, or Firm* — Sheridan Ross P.C.

(57) ABSTRACT

In one embodiment, the present invention is directed to reconfiguration of a communication device or other network node based on a determination that a user has a target (altered) physical condition.

20 Claims, 4 Drawing Sheets

U.S. PATENT DOCUMENTS

| | | | |
|---|---|---|---|
| 5,982,873 A | 11/1999 | Flockhart et al. | |
| 6,022,315 A * | 2/2000 | Iliff | 600/300 |
| 6,064,731 A | 5/2000 | Flockhart et al. | |
| 6,084,954 A | 7/2000 | Harless et al. | |
| 6,088,441 A | 7/2000 | Flockhart et al. | |
| 6,122,614 A | 9/2000 | Kahn et al. | |
| 6,151,571 A | 11/2000 | Pertrushin | |
| 6,163,607 A | 12/2000 | Bogart et al. | |
| 6,173,053 B1 | 1/2001 | Bogart et al. | |
| 6,178,400 B1 | 1/2001 | Eslambolchi | |
| 6,192,122 B1 | 2/2001 | Flockhart et al. | |
| 6,243,680 B1 | 6/2001 | Gupta et al. | |
| 6,259,969 B1 | 7/2001 | Tackett et al. | |
| 6,275,806 B1 | 8/2001 | Pertrushin | |
| 6,275,991 B1 | 8/2001 | Erlin | |
| 6,278,777 B1 | 8/2001 | Morley et al. | |
| 6,292,550 B1 | 9/2001 | Burritt | |
| 6,314,165 B1 | 11/2001 | Junqua et al. | |
| 6,353,810 B1 | 3/2002 | Petrushin | |
| 6,363,346 B1 | 3/2002 | Walters | |
| 6,374,221 B1 | 4/2002 | Haimi-Cohen | |
| 6,389,132 B1 | 5/2002 | Price | |
| 6,408,273 B1 | 6/2002 | Quagliaro et al. | |
| 6,427,137 B2 | 7/2002 | Petrushin | |
| 6,463,415 B2 | 10/2002 | St. John | |
| 6,480,826 B2 | 11/2002 | Pertrushin | |
| 6,643,622 B2 | 11/2003 | Stuart et al. | |
| 6,690,940 B1 * | 2/2004 | Brown et al. | 455/456.4 |
| 6,697,457 B2 | 2/2004 | Petrushin | |
| 6,766,014 B2 | 7/2004 | Flockhart et al. | |
| 6,801,888 B2 | 10/2004 | Hejna, Jr. | |
| 6,823,312 B2 | 11/2004 | Mittal et al. | |
| 6,839,669 B1 | 1/2005 | Gould et al. | |
| 6,847,714 B2 | 1/2005 | Das et al. | |
| 6,889,186 B1 | 5/2005 | Michaelis | |
| 6,940,951 B2 | 9/2005 | Mahoney | |
| 6,979,298 B2 | 12/2005 | Vodyanoy et al. | |
| 6,999,563 B1 | 2/2006 | Thorpe et al. | |
| 7,065,485 B1 | 6/2006 | Chong-White et al. | |
| 7,180,997 B2 | 2/2007 | Knappe | |
| 7,222,074 B2 | 5/2007 | Zhou | |
| 7,222,075 B2 | 5/2007 | Petrushin | |
| 7,261,691 B1 | 8/2007 | Asomani | |
| 7,267,652 B2 | 9/2007 | Coyle et al. | |
| 7,398,213 B1 | 7/2008 | Levanon et al. | |
| 7,490,085 B2 | 2/2009 | Walker et al. | |
| 7,522,060 B1 * | 4/2009 | Tumperi et al. | 340/573.4 |
| 7,529,670 B1 * | 5/2009 | Michaelis | 704/253 |
| 2002/0084130 A1 * | 7/2002 | Der Ghazarian et al. | 180/272 |
| 2002/0091473 A1 * | 7/2002 | Gardner et al. | 701/35 |
| 2002/0128000 A1 * | 9/2002 | do Nascimento, Jr. | 455/414 |
| 2003/0009341 A1 | 1/2003 | Cheng et al. | |
| 2003/0069002 A1 * | 4/2003 | Hunter et al. | 455/404 |
| 2003/0096594 A1 * | 5/2003 | Naboulsi | 455/411 |
| 2003/0191639 A1 | 10/2003 | Mazza | |
| 2004/0039261 A1 | 2/2004 | Bardy | |
| 2004/0054263 A1 | 3/2004 | Moerman et al. | |
| 2004/0148161 A1 | 7/2004 | Das et al. | |
| 2004/0148356 A1 | 7/2004 | Bishop et al. | |
| 2004/0215453 A1 | 10/2004 | Orbach | |
| 2005/0010416 A1 | 1/2005 | Anderson et al. | |
| 2005/0065789 A1 | 3/2005 | Yacoub et al. | |
| 2005/0094822 A1 | 5/2005 | Swartz | |
| 2005/0137753 A1 | 6/2005 | Basson et al. | |
| 2005/0163302 A1 | 7/2005 | Mock et al. | |
| 2005/0228234 A1 | 10/2005 | Yang | |
| 2005/0241871 A1 * | 11/2005 | Stewart et al. | 180/272 |
| 2006/0009257 A1 * | 1/2006 | Ku | 455/556.1 |
| 2006/0020466 A1 | 1/2006 | Cousineau et al. | |
| 2006/0028556 A1 | 2/2006 | Bunn et al. | |
| 2006/0036437 A1 | 2/2006 | Bushey et al. | |
| 2006/0058697 A1 | 3/2006 | Mochizuki et al. | |
| 2006/0085543 A1 * | 4/2006 | Hrastar et al. | 709/224 |
| 2006/0148490 A1 * | 7/2006 | Bates et al. | 455/456.1 |
| 2006/0167595 A1 * | 7/2006 | Breed et al. | 701/1 |
| 2006/0173256 A1 * | 8/2006 | Ridder et al. | 600/316 |
| 2006/0183980 A1 | 8/2006 | Yang | |
| 2006/0190419 A1 * | 8/2006 | Bunn et al. | 706/2 |
| 2006/0203992 A1 | 9/2006 | Kim | |
| 2006/0212195 A1 * | 9/2006 | Veith et al. | 701/35 |
| 2006/0229505 A1 | 10/2006 | Mundt et al. | |
| 2006/0252376 A1 | 11/2006 | Fok | |
| 2006/0271404 A1 * | 11/2006 | Brown | 705/2 |
| 2007/0011012 A1 * | 1/2007 | Yurick et al. | 704/277 |
| 2007/0038635 A1 | 2/2007 | Murzina | |
| 2007/0067436 A1 * | 3/2007 | Vaughn | 709/224 |
| 2007/0072156 A1 * | 3/2007 | Kaufman et al. | 434/236 |
| 2007/0106127 A1 | 5/2007 | Alman | |
| 2007/0124135 A1 * | 5/2007 | Schultz | 704/201 |
| 2007/0173726 A1 | 7/2007 | Kim et al. | |

FOREIGN PATENT DOCUMENTS

| | | |
|---|---|---|
| EP | 0076687 | 4/1983 |
| EP | 0140249 | 5/1985 |
| EP | 0360265 | 3/1990 |
| JP | 10-124089 | 5/1998 |
| WO | WO 00/22611 | 4/2000 |
| WO | WO 2004/056086 | 7/2004 |

OTHER PUBLICATIONS

U.S. Appl. No. 11/388,694, filed Mar. 24, 2006, Blair et al.

U.S. Appl. No. 10/882,975, filed Jun. 30, 2004, Becker et al.

Landauer et al., "An Introduction to Latent Semantic Analysis", Discourse Processes, 1998, 41 pages.

Lin et al., "Phoneme-less Hierarchical Accent Classification", HP Laboratories Palo Alto, Oct. 4, 2004, 5 pages.

Michaelis, "Speech Digitization and Compression", In W. Warkowski (Ed.), International Encyclopedia of Ergonomics and Human Factors. London: Taylor Francis, 2001, 683-686.

U.S. Appl. No. 10/756,669, filed Jan. 12, 2004, Thambiratnam.

U.S. Appl. No. 11/131,108, filed May 16, 2005, Michaelis.

"Assistive Writing," AbilityHub.com (printed Apr. 11, 2005), available at http://www.abilityhub.com/speech/speech-ld.htm, 2 pages.

"Automatic Speech Recognition," Technology Access Program, AbilityHub.com (Fall 2002), available at http://tap.gallaudet.edu/SpeechRecog.htm, 2 pages.

"Contrasts in Pronunciation," (undated), available at http://www.bohemica.com/czechonline/reference/pronunciation/contrasts.htm, 2 pages.

"Inside Speech Recognition," (printed Apr. 11, 2005), available at http://fsug.org/usyd.edu.au/documentation/HOWTO/Speech-Recognition-HOWTO/inside...., 2 pages.

"Speech Recognition," (printed Apr. 11, 2005) available at http://murray.newcastle.edu.au/user/staff/speech/home_pages/tutorial_sr.html, 5 pages.

Arslan, Levent M., "Foreign Accent Classification in American English," thesis, pp. 1-200, Department of Electrical Computer Engineering, Duke University, 1996.

Arslan, Levent M., et al., "Language Accent Classification in American English," Robust Speech Processing Laboratory Department of Electrical Engineering, Durham, North Carolina, Technical Report RSPL-96-7(1996).

Hansen, John H.L., et al., "Foreign Accent Classification Using Source Generator Based Prosodic Features," IEEE Proc. ICASSP, vol. 1, Detroit U.S.A., (1995), pp. 836-839.

Hosom, John-Paul, et al., "Training Neural Networks for Speech Recognition," Center for Spoken Language Understanding, Oregon Graduate Institute of Science and Technology (Feb. 2, 1999), 51 pages.

Jackson, Philip J.B., et al., "Aero-Acoustic Modeling of Voiced and Unvoiced Fricatives Based on MRI Data," University of Birmingham and University of Southampton, (undated), 4 pages.

Kirriemuri, John, "Speech Recognition Technologies," TSW 03-03 (Mar. 2003), 13 pages.

Lamel, L.F., et al., "Language Identification Using Phone-based Acoustic Likelihoods," ICASSP-94.

Laramee, François Dominic, "Speech Interfaces for Games—Part 1: How Speech Recognition Words," GIGnews.com (2000), available at http://www.gignews.com/fdlspeech2.htm, 5 pages.

Loizou, Philip, "Speech Production and Perception," EE 6362 Lecture Notes (Fall 2000), pp. 1-30.

Markowitz, J., "Glossaries," available at http://www.jmarkowitz.com/glossary.html, 4 pages.

Michaelis, Paul Roller, "Speech Digitization and Compression," Avaya Laboratories (undated), pp. 1-5.

Noth, E., et al., "Research Issues for the Next Generation Spoken"; University of Erlangen-Nuremberg, Bavarian Research Centre for Knowledge-Based Systems, at http://www5.informatik.uni-erlangen.de/literature/psdir/1999/Noeth99:RIF.ps. gz, downloaded Feb. 10, 2003.

Pervasive, Human-Centered Computing, MIT Project Oxygen, MIT Laboratory for Computer Science, Jun. 2000.

Zue, Victor, "The MIT Oxygen Project," MIT Laboratory for Computer Science, Apr. 25-26, 2000.

Background of the Invention for the above-captioned application (previously provided).

"Module 3"; Available at: http://www.dendrites.com/mod3r.html; Undated; 244 pages.

Aviation Safety Investigation Report; Available at: http://64.233.167.104/search?q=cache:xL7YYq5EvwsJ:www.atsb. gov.au/aviation/pdf/200204328. pdf+%22speech+analysis%22+%22detect%22+and+%22state+of+intoxication%22&hl=en&gl=us&ct=clnk&cd=1; Undated; 151 pages; Australian Transport Safety Bureau.

"Dialing Under the Influence"; Available at: http://www.virginmobile.com.au/services/duti.html; 2006; 2 pages; Virgin Mobile.

"Module 4, Autonomic Nervous System: Clinical Implications and Non Pharmaceutical Applications."; Available at: http://www.dendrites.com/module4.htm; Undated; 39 pages.

"Agile Lie Detector"; Available at: http://www.agilemobile.com/agile_liedetector.html; 2004; 1 page; Agilemobile.com .

De-FIB-ulator Portable "Lie Detector"; Available at: http://www.sharperimage.com/us/en/catalog/product/sku_AR002; 2006; 2 pages; The Sharper Image.

"Lie Detection and a Major Breakthrough in Price and Portability!"; Available at: http://www.pimall.com/nais/e.pse.html; 2006; Thomas Investigative Publications, Inc.; Austin, Tx.

Hollien H.; "Production of intoxication states by actors—acoustic and temporal characteristics."; J. Forensic Sci.; Jan 2001; 46(1); pp. 68-73; Two-page internet summary available at http://www.ncbi.nlm.nih.gov/entrez/query.fcgi? db=pubmed&cmd=Retrieve&dopt=Abstract&list_uids=11210927&query_h1=3&itool=pubmed_ExternalLink.

Johnson K.; "Do voice recordings reveal whether a person is intoxicated? A case study."; Phonetica; 1990; 47(3-4); pp. 215-237; One-page internet summary available at http://www.ncbi.nlm.nih.gov/entrez/query.fcgi? db=pubmed&cmd=Retrieve&dopt=Abstract&list_uids=2130381&query$_{13}$ hl=5&itool=pubmed_ExternalLink.

Pisoni DB.; "Effects of alcohol on the acoustic-phonetic properties of speech: perceptual and acoustic analyses."; Alcohol Clin Exp Res.; Aug 1989; 13(4); pp. 577-587; One-page internet summary available at http://www.ncbi.nlm.nih.gov/entrez/query.fcgi? db=pubmed&cmd=Retrieve&dopt=Abstract&list_uids=2679214&query_hl=7& itool=pubmed_ExternalLink.

U.S. Appl. No. 11/508,477, filed Aug. 22, 2006, Michaelis.

U.S. Appl. No. 11/768,567, filed Jun. 26, 2007, Coughlan.

Watson PI, Ciccia AH, Weismer G (2003), The relation oflung volume initiation to selected acoustic properties of speech. J Acoust Soc Am 113:2812-2819.

Novak, D Cuesta-Frau, and L. Lhotska: Speech recognition methods applied to biomedical signals processing. Engineering in Medicine and Biology Society. 2004; 1: 118-121.

Entwistle, the performance of automated speech recognition systems under adverse conditions of human exertion. Int. J. Hum.-Comput. Interact. 16 (2003) (2), pp. 127-140.

Entwistle, "Training Methods and Enrollment Techniques to Improve the Performance of Automated Speech Recognition Systems Under Conditions of Human Exertion", A Dissertation Submitted in Partial Fulfillment of the Requirements for the Degree of Doctor of Philosophy, University of South Dakota, Jul. 2005.

Official Action for U.S. Appl. No. 11/508,477, mailed Mar. 30, 2010.

Osburn, "What are symptoms of hypoglycemia?" Essortment.com, posted Nov. 27, 2005, accessed via Internet archive on Aug. 23, 2010 at http://web.archive.org/web/20051127014722/va.essortment.com/hypoglycemiasym_rjfc.htm, 2 pages.

Kawaguchi et al., "Development of a telenursing system for patients with chronic conditions," Journal of Telemedicine and Telecare, 2004, vol. 10, No. 4, pp. 239-244.

Black et al., "Implementing autonomy in a diabetes management system," Journal of Telemedicein and Telecare, 2005, vol. 11, Suppl. 1. pp. 6-8.

"Voice-dialgoue system eases diabetes monitoring," The British Journal of Healthcare Computing & Information Management, Oct. 2005, vol. 22, No. 8, p. 25.

Symptoms of Diabetes,' WrongDiagnosis.com, published on Jun. 27, 2003, accessed on Aug. 23, 2010 via Internet Archive at http://web.archive.org/web/20030627021518/http:/www.wrongdiagnosis.com/dIdiabetes/symptoms.htm, 3 pages.

"Hypoglycemia," MedicineNet.com, published on Jan. 19, 2006, accessed on Aug. 23, 2010 via Internet Archive, at http://web.archive.org/web/20060119000857/http:/www.medicinenet.com/hypoglycemia/page2.htm, 3 pages.

"Hyperglycemia (High Blood Sugar)," University of Iowa Hopstials & Clinics, published on Mar. 23, 2006, accessed on Sep. 9, 2010 via Internet Archive at http://web.archive.org/web/20060323081940/http://www. uihealthca reo com/topi cs/di abetes/hyperg lycemia.html, 2 pages.

"New Test May Detect Parkinson's Early, Aid Search for Drugs," Foundation in the News, Jan. 7, 2005, http://www.michaeljfox.org/news/article.php?id=143&sec=3, 2 pages.

* cited by examiner

DYNAMIC USER INTERFACE FOR THE TEMPORARILY IMPAIRED BASED ON AUTOMATIC ANALYSIS FOR SPEECH PATTERNS

CROSS REFERENCE TO RELATED APPLICATION

Cross reference is made to U.S. patent application Ser. No. 11/508,477, filed concurrently herewith, entitled "DETECTION OF EXTREME HYPOGLYCEMIA AND HYPERGLYCEMIA BASED ON AUTOMATIC ANALYSIS OF SPEECH PATTERNS", to Michaelis, which is incorporated herein by this reference.

FIELD OF THE INVENTION

The invention relates generally to speech analysis and particularly to analysis of speech to identify a selected physical condition or state of a user.

BACKGROUND OF THE INVENTION

Alcohol consumption continues to be at high levels worldwide. Alcohol is consumed not only at home and in restaurants but also at sporting events and entertainment facilities, such as bars, nightclubs, discotheques, dance halls, concerts, and parties. The inevitable consequence of drinking too much alcohol is a condition known as intoxication. When an individual is intoxicated, his or her fine motor skills and mental functions are impaired leading to a variety of problems. The evils of drinking and driving are only too well known. A desirable alternative to drinking and driving is calling a cab or catching a ride with a friend or acquaintance. Unfortunately, intoxicated individuals are frequently unable to operate a phone and therefore to make a call to seek such assistance.

Another unfortunate consequence of intoxication is a condition known as poor judgment. When intoxicated, individuals often make phone calls to friends, fellow employees, and loved ones that they later regret. Currently, one cellular service provider permits an individual to disable their cell phones for specified periods of time when the individual is planning on imbibing substantial quantities of alcohol.

Yet another problem with intoxication is that the intoxicated person typically is not aware that he or she is intoxicated. Without this knowledge, he or she will attempt to drive, with potentially fatal consequences. A mobile phone is currently available that includes a breath analyzer to detect alcohol.

SUMMARY OF THE INVENTION

These and other needs are addressed by the various embodiments and configurations of the present invention. The present invention is generally directed to the reconfiguration of a communication device and/or other network node based on the user having a temporally limited, altered physical condition and the use of speech, particularly (but not exclusively) uttered in the course of a multi-person communication, such as a telephone call, to evaluate the physical state of the speaker.

In a first embodiment, a method includes the steps of:
(a) determining whether the speaker likely has a target physical condition (e.g., a voluntary physical condition such as intoxication); and
(b) when the speaker likely has the target physical condition, reconfiguring a communication device to be operated by the speaker from a first user configuration to a second configuration and/or a network node from a first to a second network node configuration.

In one configuration, the determination is effected by performing a breath analysis of the user. In other words, a breath analyzer, such as a breathalyzer, is preferably included in the user's telephone in proximity to the microphone.

In another configuration, the determination can be acoustic-phonetic analysis of the voice utterance to determine the likelihood that the speaker has the target physical condition and/or a likely degree or severity of the target physical condition. The acoustic-phonetic analysis analyzes, with reference to a baseline utterance of the user one or more of a formant of the utterance, a pitch of the utterance, a speech and/or articulation rate of the utterance, a vocal intensity of the utterance, a number of speech errors in the utterance, a response time, a nonfluency level associated with the utterance, and a speech quality of the utterance.

In one configuration, the analysis is performed by comparing speech units in the utterance with corresponding baseline speech units from the user/speaker assuming that the user/speaker does not have the target physical condition, comparing speech units in the utterance with corresponding baseline speech units from the user/speaker assuming that the user/speaker has the target physical condition; and based on the comparative results of the prior steps, determining a level of confidence that the user/speaker has and/or does not have the target physical condition.

The network node can be a switch or server, for example, and the first and second network node configurations include redirecting (e.g., to voice mail), blocking, and/or delaying selected incoming and/or outgoing contacts to and from the user. By way of illustration, the network node, in response to the altered physical state of the user, may enable an additional prompt when sending a text message input by the user while in the altered physical state, inserting a time delay when sending a text message input by the user when in the altered physical state, and sending automatically a text message input by the user, while in the altered physical state, to a drafts folder instead of sending the message to the requested destination. The communication device can be a telephone, laptop, personal computer, Personal Digital Assistant, for example, and the first and second user configurations include disabling one or more pre-selected telephone numbers, changing a size of a character font displayed by the communication device, changing a contrast between a background and icons/characters displayed by the communication device, enabling selected button tones of the communication device, changing loudness of a speaker of the communication device to permit the altered user to hear button tones caused by pressing a selected button of the communication device, enabling and/or disabling a feature/operation of the communication device, re-ordering a list of speed-dials or contacts associated with the user, and changing a speech recognition algorithm for voice commands The present invention can provide a number of advantages depending on the particular configuration. For example, it can permit intoxicated users to operate a phone and therefore to make a call to seek assistance, for example to call for a ride home. It can prevent individuals from making phone calls, that they later regret, to friends, fellow employees, and loved ones. It can inexpensively provide the user with an indication of whether he or she is intoxicated and the degree of intoxication. Implementing the functionality in a switch or adjunct or as software in the communication device can be relatively inexpensive.

These and other advantages will be apparent from the disclosure of the invention(s) contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Overview of the Network Architecture

Figure 1:
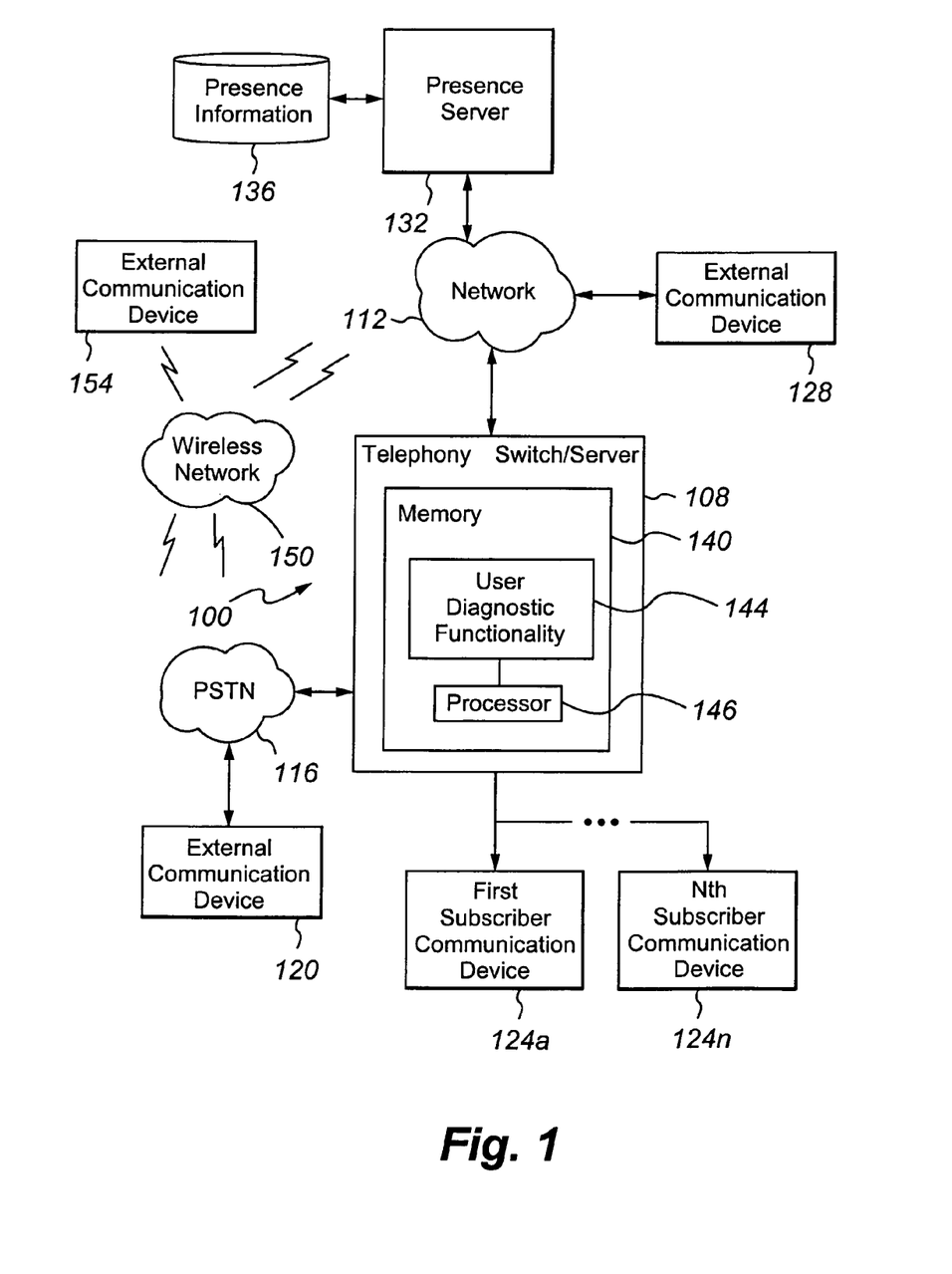
FIG. 1 is a block diagram of an enterprise architecture according to an embodiment of the present invention.

FIG. 1 depicts a presence aware communications network according to a first architecture of the present invention. The presence aware communications network 100 comprises a telephony switch/server 108 for directing contacts, a packet-switched network 112, a circuit-switched Public Switched Telephone Network or PSTN 116, a first set of internal subscriber communication devices 124a-n controlled by the telephony switch/server 108, a second external communication device 120 in communication with PSTN 116, a third external communication device 128 in communication with the network 112, a wireless network 150 in wireless communication with the network 112 and/or PSTN 116 and with a fourth external communication device 154, and a presence server 132 and associated presence information database 136 for providing presence information about one or more users of the various communication devices. As will be appreciated, presence aware network components can be implemented in software and/or hardware, depending on the application.

The internal communication devices 124a-n have extensions within the premises that are directly serviced by the switch. More particularly, these extensions correspond to conventional terminal endpoints serviced by the switch/server 108, and the switch/server 108 can direct incoming calls to and receive outgoing calls from these extensions in a conventional manner. The second and third communication devices 120 and 128 are referred to as "external" in that they are not directly supported as terminal endpoints by the switch/server 108.

The telephony switch/media server 108 can be any architecture for directing contacts to one or more communication devices. Illustratively, the switch/server 108 of FIG. 1 can be a modified form of the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Definity™, Multi-Vantage™, or Communication Manager™ private-branch exchange (PBX)-based ACD system; or Avaya Inc.'s IP Office™. The switch or media server 108 typically is a stored-program-controlled system that conventionally includes interfaces to external communication links, a communications switching fabric, service circuits (e.g., tone generators, announcement circuits, etc.), memory 140 for storing control programs and data, and a processor 146 (i.e., a computer) for executing the stored control programs to control the interfaces and the fabric and to provide automatic contact-distribution functionality. The switch/server 108 comprises a network interface card to provide services to the subscriber communication devices 124a-n. Included in the memory 140 is the user diagnostic functionality 144 that monitors the physical state of selected subscribers (e.g., by analyzing voice streams of the selected subscribers) to detect a voluntary physical state or condition of the subscriber, particularly an altered mental state due to ingestion of alcohol and/or a drug (e.g., intoxication or a drug-induced high). Switch-server 108 can include a gateway (not shown) to provide signal control and conversion capabilities between the circuit-switched PSTN 116 or some other type of circuit-switched network and the packet-switched network 112.

The packet-switched network 112 can be any data and/or distributed processing network, such as the Internet. The network 112 typically includes proxies, registrars, and routers for managing packet flows.

The set of first subscriber communication devices 124a-n and second, third, and fourth communication devices 120, 128 and 154, respectively, can be any communication device suitable for the network to which they are connected. The first set of communication devices 124a-n are packet-switched and/or circuit-switched and can include, for example, IP hardphones, IP softphones, Personal Digital Assistants or PDAs, Personal Computers or PCs, and laptops. The second, third, and fourth communication devices 120, 128, and 154 are circuit-switched and/or packet-switched and can include, for example, wired and wireless telephones, PDAs, pagers, facsimile machines, and modems.

The presence server 132 collects published presence information about a communication device and/or user thereof and stores the collected information in the presence information database 136. The database 136 further includes permissible personal information about the subscriber, such as name, and home and business addresses. The presence server typically retrieves presence information by querying against the user's identity as opposed to the device address. In the presence information database all presence information is indexed by a user's identity rather than device address. The presence server 132 provides the collected information to other network entities in response to queries. The presence server 132 can collect only information respecting the user's interaction with the various entities of FIG. 1 and/or other information provided directly or indirectly by the user when those entities publish their presence information to the presence server. The presence server 132 can interact with additional presence services (now shown) that continually collect and redistribute availability data from publishing sources authorized by the user.

The User Diagnostic Functionality

Included in the memory 140 is the user diagnostic functionality, which monitors and analyzes selected subscriber's breath samples and/or voice streams to detect a corresponding voluntary physical state of the subscriber. Although the voluntary state is discussed with specific reference to alcohol intoxication, it may be any other voluntarily altered physical state, such as mental changes caused by drug consumption that can be detected by breath and/or voice analysis. The breath sample can be received while the user is speaking by locating a breath analyzer in the vicinity of the microphone. The voice stream can be received when the subscriber is using any of the internal and external communication devices as part of a contact or call. The term "contact" or "call" as used herein is intended to include not only telephone calls but also non-telephonic communications, such as data transmissions such as electronic mail, voice-over-IP, facsimile, etc., whether circuit switched or packet switched. When a selected (target) voluntary physical state is detected, the functionality 144 takes appropriate actions, including reconfiguration of the communication device and/or a network node other than the communication device (e.g., a switch and server). Reconfiguration may include automatically disabling one or more preselected telephone numbers stored in the communication device and/or a network node (e.g., switch or server) (e.g., the telephone number of a fellow employee, supervisor, ex-spouse, etc.) so that the device is unable to contact the numbers without entry of a relatively complex authorization code and/or activation of a sequence of keys in a specific order and otherwise reconfiguring the phone from a first (user normal) mode to a second (user impaired) mode in which the phone operates a more user friendly manner given the voluntarily altered state of the user. Device reconfiguration to the second mode may include improving the legibility of the device's display screen through increasing the size of the character font and/or increasing the contrast between the background and the displayed icons/characters, enabling button tones and/or increasing the loudness of the speaker in the communication device to permit the altered user to hear button tones caused by pressing a selected button and/or enabling/disabling a feature/operation of the communication device, re-ordering the list of speed-dials or contacts so that the number of a taxi or limousine service, law enforcement agency, supervisor, friend, and/or spouse, sibling, parent, and/or other relative are the first available options, enabling a modified speech recognition algorithm for voice commands to overcome the speech impairment and permit the intoxicated user to verbally interact with the communication device, redirecting an incoming call to a destination other than the communication device (e.g., a voice messaging server), blocking completely outgoing voice calls from the communication device, enabling an additional user prompt when sending a text message input by the user (e.g., "are you sure that you want to send this message?"), inserting a time delay (e.g., 30 minutes) when sending a text message input by the user to give the user time to undo the message, or sending a text message input by the user to the "drafts" folder instead of to the intended destination.

The second mode may be reset to the first mode automatically by the passage of a selected time period, e.g., six hours) or by the detection of normal speech by the formerly intoxicated user. Alternatively, the user can reset the device and/or node to the first mode by entry of a relatively complex authorization code and/or activation of a sequence of keys in a specific order. In one variation, the device sends automatically a voice, text, or multimedia message to a selected electronic address when the device detects a selected degree of altered mental state. The electronic address may be a taxi service, a friend, spouse, supervisor, relative, or some other selected entity. As part of the message, the functionality 144 can query the presence server 132 for presence information associated with the user and include the information in the message. The presence information could include, for example, contact information respecting a communication device at which the user is currently available and/or a current physical location of the user. The functionality can determine the degree of severity of the voluntarily induced physical condition by analysis of the degree or extent of deviation of the subscriber's speech from a baseline condition.

When acoustic-phonetic techniques are employed, the analysis uses selected units of the user's speech. Human speech is affected by the unique interaction of the lungs, trachea (windpipe), larynx, pharyngeal cavity (throat), oral cavity (mouth), and nasal cavity. The pharyngeal and oral cavities are known as the vocal tract. The vocal folds (cords), soft palate or velum, tongue, teeth, and lips move to different positions to produce various speech sounds and are known as articulators. Any part of the original pitch that is near a resonance frequency of the vocal tract are amplified while any part that is not near the resonance frequency is attenuated. As the relative positions of the articulators are altered, the vocal tract resonance frequency is changed. The vocal tract resonances thus become variable points of amplification of the original excitation signal and are referred to as formants.

Depending on the type of excitation by the larynx and lungs, two types of sounds can be produced, namely voiced and unvoiced sounds or utterances. As used herein, an "utterance" refers to any speech component that is uttered or audibly expressed by a person, including sentences, phrases, words, portions of words, and letters. Voiced speech sounds (for example, the "V" sound in "voice") are produced by tensing the vocal cords while exhaling. The tensed vocal cords briefly interrupt the flow of air, releasing it in short periodic bursts. The greater the frequency with which the bursts are released, the higher the fundamental pitch. Unvoiced sounds (for example, the final "S" sound in "voice") are produced when air is forced past relaxed vocal cords. The relaxed cords do not interrupt the air flow; the sound is instead generated by audible turbulence in the vocal tract. A simple demonstration of the role of the vocal cords in producing voice and unvoiced sounds can be had by placing one's fingers lightly on the larynx, or voice box, while slowly saying the word "voice." The vocal cords will be felt to vibrate for the "V" sound and for the double vowel (or diphthong) "oi" but not for the final "S" sound.

Except when whispering, all vowel and nasal sounds in spoken English are voiced. Plosive sounds—also known as stops—may be voiced or unvoiced. Examples of voiced plosives include the sounds associated with "B" and "D". Examples of unvoiced plosives include the sounds associated with "P" and "T." Fricative sounds may also be voiced or unvoiced. Examples of voiced fricatives include the sounds associated with "V" and "Z." Examples of unvoiced fricatives include the sounds associated with "F" and "S."

The movement and location of the tongue, jaw, and lips are identical for the "B" and "P" sounds, the only difference being whether the sounds are voiced. The same is true of the "D" and "T" pair, the "V" and "F" pair, and the "Z" and "S" pair.

When a person suffers from certain physical conditions, the speech units deviate, sometimes substantially, from the baseline speech unit for the same person. For example, when a user takes a stimulant, he or she can become nervous or agitated. This can cause the person to speak more rapidly. When the user takes a depressant (e.g., alcohol), he or she can have slurred speech. By comparing a set of characteristics of speech units against a baseline set of characteristics for the same speech units, the functionality 144 can detect not only that the subscriber is likely suffering from a deviant or target physical condition but also the type and severity of the target physical condition.

The set of characteristics can be any measure or set of auditory and/or acoustic-phonetic measures, such as fundamental frequency (pitch or F0), formant or F-pattern, speech or articulation rate, vocal intensity (loudness), speech errors, response time, nonfluency level, and aspects of speech quality. A user who has taken a substantial amount of a stimulant will, for example, have (relative to baseline characteristics under normal conditions) a pronounced increase in pitch, vocal intensity, and speech or articulation rate. When the user has taken a substantial amount of a depressant (e.g., the user is intoxicated), there will be (relative to baseline characteristics under normal conditions) a decrease in speech or articulation rate, misarticulation of specific difficult voiced and unvoiced sounds, such as fricatives and plosives (e.g., "r" to "l", "s" to "sh", "ez" to "es"), an increase in the fundamental frequency, and an increase in the number of speech errors or nonfluencies per unit time. Speech and articulation rates are both durational measurements in terms of the number of syllables per second. Speech rate is calculated by dividing the duration of the entire utterance, including any pauses, by the total number of syllables in the utterance. Articulation rate is calculated in a similar way, except that the silent pauses within the utterance of not included in the calculation. The deviation from baseline will become greater, or worsen, in direct relation to the amount of stimulant/depressant consumed (e.g., the more intoxicated the person becomes).

Different speech sounds are typically articulated with different time frames; that is, some speech sounds take longer to articulate than others. To maintain comparability when calculating articulation rates over relatively small quantities of data, such as short utterances, it is preferable to calculate articulation rate over a linguistically equivalent utterance. For example, a linguistically equivalent utterance would have the same set of words, such as "Hello, this is Mike", "How are you doing today?", "How can I help you?", etc.

Figure 2:
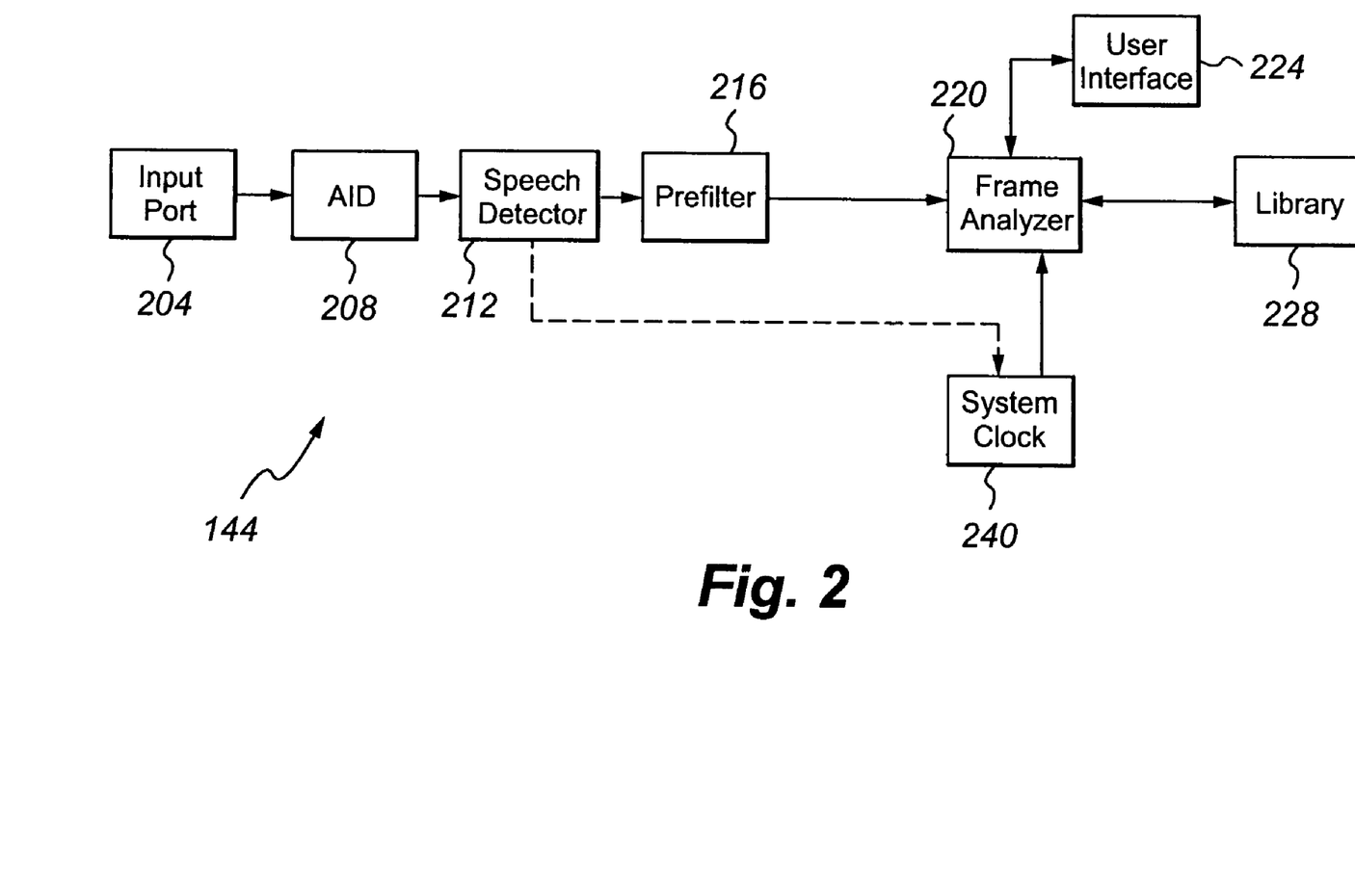
FIG. 2 is a block diagram of the components of the user diagnostic functionality according to an embodiment of the present invention.

FIG. 2 depicts the various computational modules forming the user diagnostic functionality 144. The functionality 144 receives an analog speech signal at an input port 204 (such as a microphone) and converts this signal to a text equivalent of the digital speech signal. In one configuration, the functionality 144 matches an utterance under analysis with a linguistically equivalent baseline utterance defined by subword models or word models which are built from subword models with predefined word lexicon. The recognized word or subword units are used to construct the whole word sequence with the help of language models. A continuous speech recognition system can recognize an entire sentence by first constructing a finite-state network, with or without a grammar-based language model, to represent the possible sentence model. Although the system 100 is based on a pattern recognition speech recognition approach, it is to be understood that the system may be implemented using other speech recognition approaches, such as the acoustic-phonetic or artificial intelligence approaches.

As illustrated, the speech processing system 100 includes: an analog to digital (A/D) converter 208 to convert the received audio signal it into a digital audio signal, a speech detector 212 to determine when a received audio signal includes speech, a pre-filter unit 216 to effect front-end signal processing such as pre-emphasis, blocking and windowing (or frame separation), spectral analysis, feature extraction/enhancement, normalization, banding, and/or reduction of information rate and feature dimension, a frame analysis unit 220 to effect comparison and matching against baseline speech samples and recognition of the speech signal, an audio and/or video user interface 224 to interact with the user, a library 228 containing matching rules (such as pronunciation and inflection rules, grammar rules, words and corresponding phonetic parameters) and/or other acoustic characterizations (such as phonemes, diphones, triphones, tetraphones, or actual recorded speech samples) and optionally exceptions thereto, and a system clock 240 to provide timing information to the frame analyzer 220 and the other system components. It should be appreciated that the blocks illustrated in FIG. 1 are functional in nature and do not necessarily correspond to discrete hardware elements. In one embodiment, for example, the functionality 144 is implemented within a single digital processing device. Hardware implementations, however, are also possible.

With continuing reference to FIG. 2, the analog speech signal received at port 204 is first sampled and digitized within the A/D converter 208 to generate a digital waveform for delivery to the speech detector 212. If the waveform contains an utterance, it is forwarded to the pre-filter unit 216.

The pre-filter unit 216 performs any of a number of possible operations depending on the particular system configuration. In pre-emphasis, the unit 216 pre-emphasizes the waveform in a manner determined by the speech production model. The spectrum of the waveform is normally flattened by the unit 216. In blocking and windowing, the unit 216 extracts the short-time features of the waveform by blocking the speech waveform into short segments called frames. The duration of each frame normally ranges from about 10 to about 30 ms and may contain one or more utterance components. The speech belonging to each frame is assumed to be stationary. To reduce the edge effect of each frame, a smoothing window (e.g., a Hammering window) is applied to each frame. Generally, each successive frame overlaps the next to generate a smoother feature set over time. Each frame has a corresponding timestamp indicating when the utterance in the frame was received by the functionality. In temporal feature extraction, features of speech are extracted from each frame in the time domain. The temporal features include short-time average energy and amplitude, short-time zero-crossing rate, short-time autocorrelation, pitch periods, root mean square (rms), maximum of amplitude, voicing quality, difference between maximum and minimum values in the positive and negative halves of the signal, sound or utterance component type, and autocorrelation peaks. In spectral analysis, the waveforms in each frame are spectrally analyzed to extract spectral information of speech. Spectral analysis can be performed using any suitable algorithm such as a mel scale FFT filter-bank, perceptual linear predictive front-end, and auditory models. In extraction and enhancement of features, the obtained spectral information is processed by extracting useful features. The features in the frequency domain may include the difference between peak and valley, the energy in a particular frequency region, the spectral gradient and spectral variation contour, and the like. In reduction of information rate and feature dimension, the rate of generation of the feature vectors is reduced.

The frame analyzer 220 receives the frames from the pre-filter 216 and compares and matches the waveform (which includes a set of speech units) in each frame against baseline library entries Once the corresponding baseline speech units are identified, the frame analyzer 220 can perform one or different types of analysis. In a first type of analysis, the frame analyzer 220 attempts to match the speech units in each frame with baseline speech units in the library 228 and thereby recognizes the corresponding baseline speech waveform, or component speech units, for each frame. As will be appreciated, the frame analyzer 220 may use any comparison and/or matching algorithm, whether performing discrete or isolated, continuous, or spontaneous word recognition. Examples of such algorithms include Hidden Markov Models (HMM), frequency analysis, differential analysis, linear algebra techniques/shortcuts, spectral distortion, and time distortion methods.

Matching is typically done by mapping speech units in the utterance assuming first that the user is in a normal physical state and second that the user is in an altered physical state. In the first case, the match is performed assuming that the speech units were properly spoken. In the second case, the match is performed assuming that certain types of speech units were not properly spoken. The results of applying each of the two cases is compared with a controlling speech model to determine which set of possible speech units conforms to the speech model. For example, the speech unit resembling "l" would first be matched with "l" and then matched with "r", "sh" with "sh" and then with "s", and "ez" with "ez" and then with "es". Based on the comparison and degree of conformance of the two cases with the speech model, the frame analyzer 220 generates a probability that each case is correct and selects the case having the highest probability as being correct. The frame analyzer 220 can then apply selected linguistic measures, such as speech errors and nonfluency level, and aspects of speech quality.

In another configuration, the frame analyzer 220 performs frame-by-frame acoustic analysis for fundamental frequency (pitch or F0), formant or F-pattern, speech and/or articulation rate, vocal intensity (loudness), and response time assuming that the subscriber is correctly speaking the speech units. As will be appreciated, each frame has a corresponding selected timestamp. This permits the analyzer 120 to apply time-based measures, such as speech and/or acoustic rate.

Figure 4:
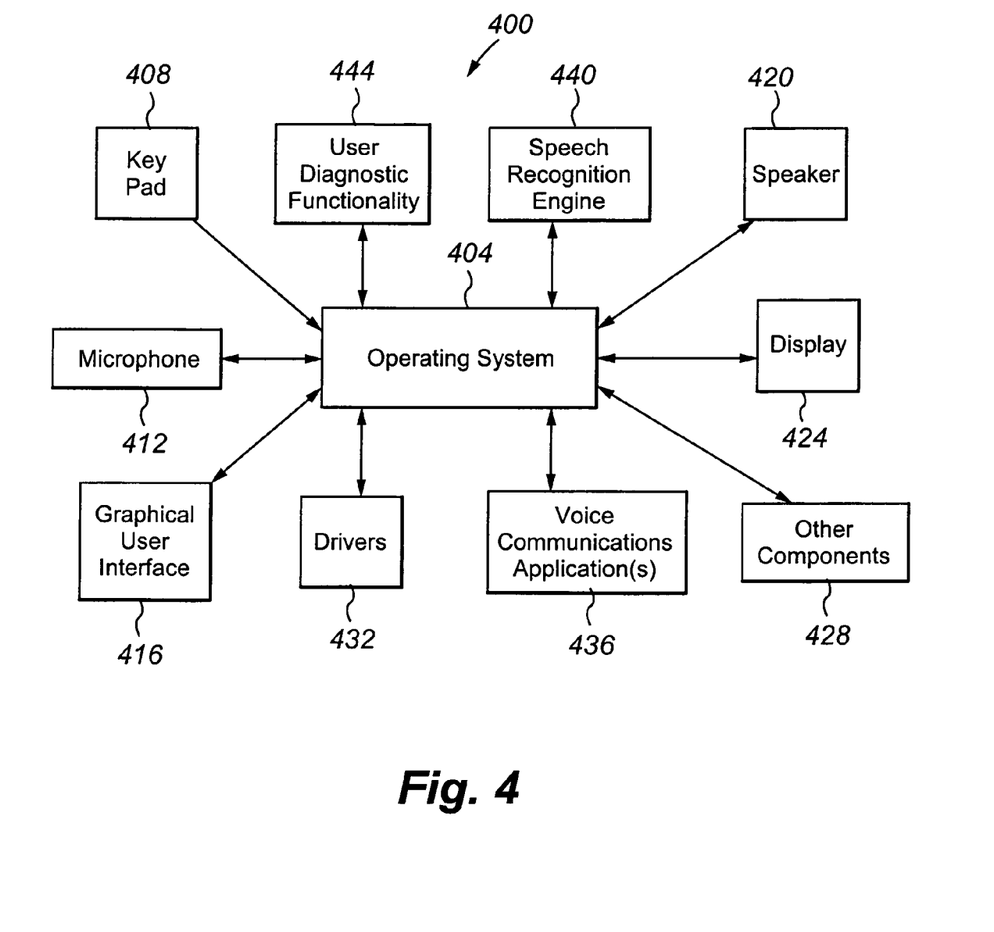
FIG. 4 depicts a communication device according to an embodiment of the present invention.

An embodiment of a communication device 400 is depicted according to an embodiment of the present invention. With reference to FIG. 4, the device 400 includes an operating system 404 to control device operations, a key pad 408 to receive tactile input from the user, a microphone 412 to receive voice input (e.g., voice commands and conversational voice streams) from the user, a Graphical User Interface or GUI 416 to receive input from the user and provide output to the user, a speaker 420 to provide audible feedback to the user and representation of an input voice stream received from another party, a display 424 (which is part of the GUI 416) to provide output to the user, drivers 432 to drive the hardware modules of the device 400 (e.g., key pad 408, microphone 412, speaker 420, and display 424), voice communication application(s) 436 to effect live voice communications between the user and other parties, a speech recognition engine 440 to convert speech to text and text to speech, user diagnostic functionality 444, and other components 428. Other components 428, which are not shown for the sake of simplicity, include hardware and software modules, such as system clock 240, wireless spatial locator (e.g., GPS unit), codec, antenna, analog-to-digital converter, digital-to-analog converter 208, filters, capacitors, resistors, memory, and processor. In one configuration, the device 400 includes a breath analyzer (not shown) located in proximity to the microphone 412.

Figure 3:
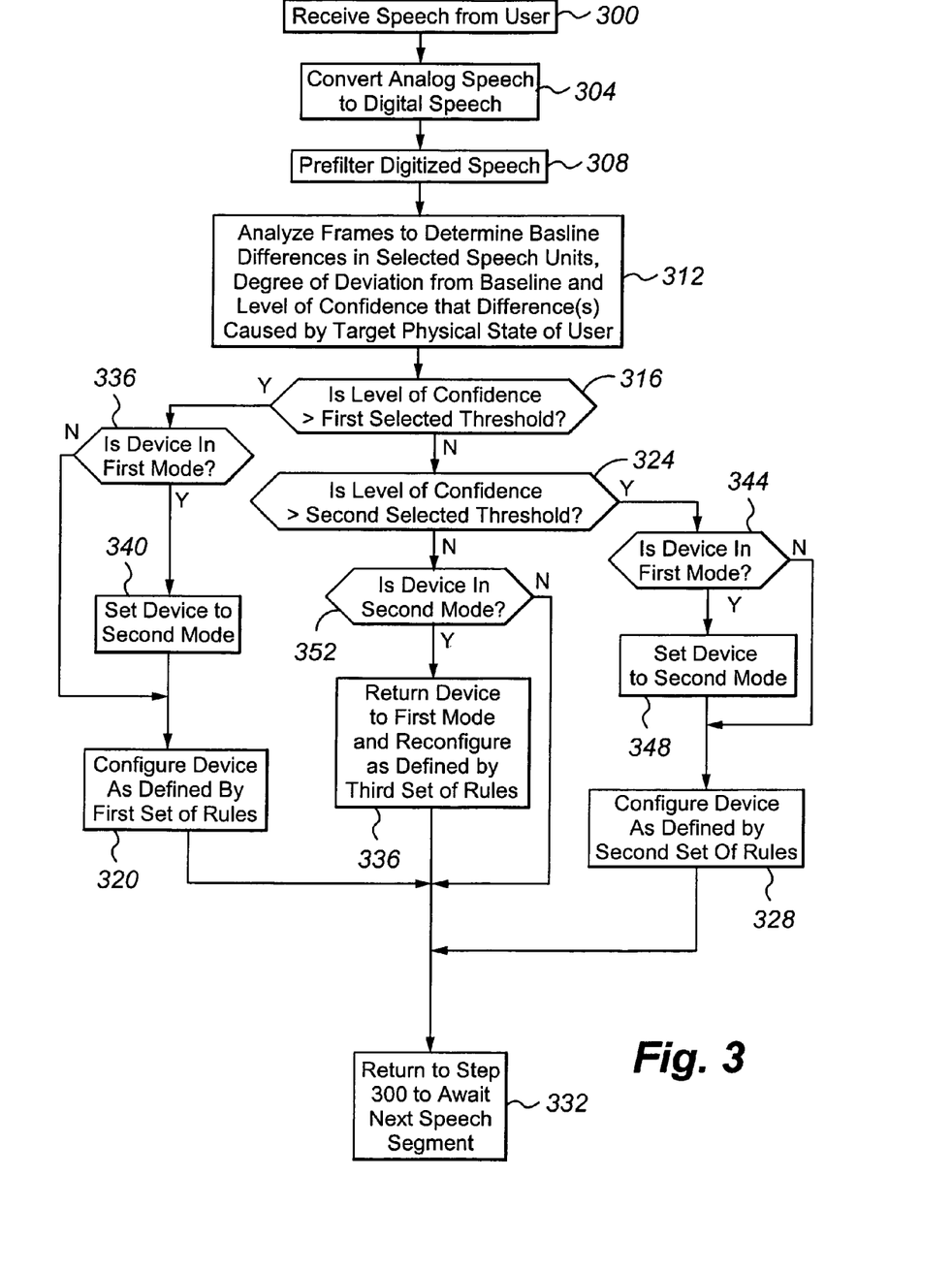
FIG. 3 is a flowchart depicting the operation of the user diagnostic functionality according to an embodiment of the present invention.

An operation of the functionality 144 will now be described with reference to FIG. 3. Although FIG. 3 is discussed with reference to physical state detection using phonetic-acoustic techniques, it is to be understood that the physical state may be detected also or alternatively using a breath analyzer.

The method assumes that the subscriber has been identified by the telephony switch/server. The identification may be effected in many ways. First, the switch/server may identify the subscriber by the electronic address (e.g., telephone number and IP address) of the internal or external communication device used by the subscriber. Typically, the presence information database 136 will include, for each subscriber, a record including the various internal and external communication devices associated with the subscriber. Second, the switch/server may request the subscriber to identify himself or herself by entering a code or identifier, such as by entering DTMF digits, or by selecting an option from a menu. The code or identifier could be a personal identifier, such as a PIN. Third, the switch/server can collect information about the subscriber's identity, for example, by collecting a speech sample and using well-known voice recognition techniques to determine the identity of the subscriber. Finally, the subscriber's identity could be determined by requesting the subscriber to speak an instruction, such as the subscriber's name, which is recognized using well known speech recognition techniques. (Speech recognition differs from voice recognition in that it refers to the capability of recognizing a given word or sequence of words, regardless of who actually speaks the word.)

In step 300, the input port 204 receives an utterance from the user.

In step 304, the utterance is converted by the A/D converter 208 from analog to digital form.

In step 308, the prefilter 216 prefilters the digitized utterance and forms the utterance into frames.

In step 312, the frame analyzer 220 receives a (next) frame and corresponding timestamp from the pre-filter. The analyzer 220 may additionally receive an utterance component identifier indicating a type of utterance component (or speech unit) in the frame. The frame analyzer 220 determines a level of confidence that the speaker has a specified type of physical condition (e.g., alcohol intoxication and normal) and, if the level of confidence is above a selected value, a likely degree of severity, or level, of the physical condition. In one configuration, the analyzer 220 outputs a first level of confidence that the user has a target physical condition and a second level of confidence regarding the detected severity of the target physical condition (hereinafter set of level(s) of confidence).

In decision diamond 316, the analyzer 220 determines whether the member(s) of the set of level(s) of confidence is/are greater than a first set of selected threshold(s). The first set of selected threshold(s) indicates a compelling or high likelihood that the user has a target condition and that the condition is severe.

If the set of level(s) of confidence is/are greater than the first set of selected thresholds, the functionality 144, in decision diamond 336, determines whether the device is in the first (user normal) operating mode. If so, the device, in step 340, is set to the second (user altered) operating mode. In step 320, the functionality 144 causes the device to be configured in accordance with a first set of rules. For example, the first set of rules defines the configuration of the device for a person who is very or severely intoxicated. The rules include one or more of the rules noted above. Additionally, the device may initiate automatically an outgoing call to a selected number, such as a taxi service, friend, parent, spouse, and the like, requesting assistance. The outgoing call would play a prerecorded or synthesized message notifying the called party that the user of the device is intoxicated, providing the physical location of the user, and requesting that the user be given a ride home.

When the set of level(s) of confidence is/are less than the first set of selected thresholds, the functionality 144, in decision diamond 324, determines if the set of level(s) of confidence, though less than the first set of selected threshold(s), is/are more than a second set of selected threshold(s). The second set of selected threshold(s) indicates a substantial, but not compelling or high, likelihood that the user has a target condition and that the condition is not severe.

If the set of level(s) of confidence is/are more than the second set of selected threshold(s), the functionality 144, in decision diamond 344, determines whether the device is currently in the first operating mode. If so, the device, in step 348, is set to the second (user altered) operating mode. In step 328, the functionality 144 causes the device to be configured in accordance with a second set of rules. The first set of rules are associated with a severe manifestation of the target condition in the user while the second set of rules are associated with a substantial, but not severe, manifestation. Thus, the first set of rules are generally more aggressive than the second set of rules. For example, while the first set of rules may initiate automatically an outgoing call to a selected number, such as a taxi service, friend, parent, spouse, and the like, requesting assistance, the second set of rules may simply reconfigure the display 424 to make it more easily operated by the user when in a slightly altered state.

If the set of level(s) of confidence is/are less than the first and second sets of selected threshold(s), the functionality 144 determines whether the device is in the second operating mode in decision diamond 352. If so, the functionality 144, in step 356, returns the device to the first operating mode and reconfigures the device as defined by a third set of rules. The third set of rules are associated with a user being in the normal, or unaltered, state.

After performing one of steps 320, 328, and 356, the functionality 144 proceeds to step 332 and returns to step 300 to await the next speech segment.

A number of variations and modifications of the invention can be used. It would be possible to provide for some features of the invention without providing others.

For example in one alternative embodiment, the user diagnostic functionality 144 is included in an adjunct to the switch/server 108.

In another alternative embodiment, the user diagnostic functionality 144 is included in the communication device itself, such as in any of the communication devices 120, 124, 128, 150. This embodiment is depicted in FIG. 4.

In yet another embodiment, the device may be used by multiple users and is reconfigured automatically for a user having an involuntary target physical condition, such as a speech impediment, a speech dialect, and the like, based on an utterance received from a specific user. For example, the device is in a first operating mode, which is the normal operating mode. When a person with a speech impediment uses or attempts to use the communication device, such as by speaking into the microphone 412 as part of a multi-party conversation or to issue speech commands, the device automatically reconfigures itself from the first operating mode to a second operating mode. The second operating mode is configured for the target physical condition of the user.

In yet another embodiment, the device is reconfigured automatically for a user having a target physical condition with the physical condition being linguistic in nature. In other words, when the speaker speaks French and the device is configured in the first operating mode for a speaker speaking English, detection of an utterance in French would cause the device to be reconfigured automatically for a French speaker. This would cause the GUI and audible synthesized speech output to the user to be converted from English to French. This embodiment would require the library 228 to include a number of speech models, with each speech model being configured for a specific language. In other words, a first speech model would be for English, a second speech model would be for German, and a third speech model would be for French. The speech utterance would be compared to each of the stored speech models to provide a corresponding level of confidence that the utterance is English, German, and French. The model having the highest level of confidence would be the model selected as controlling for the utterance.

In yet another embodiment, the present invention can permit a supervisor to supervise personnel more effectively. The supervisor or other designated personnel (e.g., security and/or human resources) could detect employee drug or alcohol use and take appropriate remedial and/or disciplinary action. For example, the supervisor could be notified by the functionality when a driver of a company vehicle is intoxicated. Alternatively, an airline could be notified by the functionality when a pilot is intoxicated. In either case, speech analysis is performed on voice utterances in the ordinary course of business. Drug and alcohol use in the workplace is becoming an increasingly larger problem each year and few alternatives for controlling the problem exist. Speech analysis can detect subtle changes in linguistic parameters indicating an altered physical state. Such subtle changes are often undetectable by the human ear. This embodiment permits a business to identify drug and alcohol use while the individual is impaired.

In yet another embodiment, dedicated hardware implementations including, but not limited to, Application Specific Integrated Circuits or ASICs, programmable logic arrays, and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be stated that the software implementations of the present invention are optionally stored on a tangible storage medium, such as a magnetic medium like a disk or tape, a magneto-optical or optical medium like a disk, or a solid state medium like a memory card or other package that houses one or more read-only (non-volatile) memories. A digital file attachment to e-mail or other self-contained information archive or set of archives is considered a distribution medium equivalent to a tangible storage medium. Accordingly, the invention is considered to include a tangible storage medium or distribution medium and prior art-recognized equivalents and successor media, in which the software implementations of the present invention are stored.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, includes components, methods, processes, systems and/or apparatus substantially as depicted and described herein, including various embodiments, subcombinations, and subsets thereof.

Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   receiving, at a first network node and from a communication device, a voice utterance of a user;
   from the voice utterance, the first network node determining whether the user has a target physical condition, wherein the target physical condition is a temporally limited altered condition of the user; and
   wherein determining whether the user has the target physical condition comprises determining a level of confidence that the user has the altered physical condition;
   if the level of confidence is above a first threshold, configuring the first network node according to a first set of rules;
   if the level of confidence is above a second threshold higher than the first threshold, configuring the first network node according to a second set of rules;
   if the level of confidence is below the first threshold, configuring the first network node according to a third set of rules;
   wherein each of the third set of rules, first set of rules and second set of rules are each distinct and feature increasing levels of adjustments respectively; and
   wherein in the second set of rules an incoming call from a third party or an outgoing call to a third party is redirected or delayed by the communication device before said call is completed.

2. The method of claim 1, wherein the communication device to be operated by the user is reconfigured, wherein the communication device effects communication between the user and another party, wherein the determination step includes the sub-step of analyzing a voice utterance received from the user, wherein the voice utterance is received during a live voice communication, and wherein the target physical condition is an altered mental state due to ingestion of alcohol or a drug.

3. The method of claim 2, wherein in the determining whether a user has a target physical condition further comprises the substep:
   performing acoustic-phonetic analysis of the voice utterance to determine a likelihood that the user has the target physical condition or a likely severity of the target physical condition.

4. The method of claim 3, wherein the acoustic-phonetic analysis analyzes, with reference to a baseline utterance of the user, at least one of a formant of the voice utterance, a pitch of the voice utterance, a speech or articulation rate of the voice utterance, a vocal intensity of the voice utterance, a number of speech errors in the voice utterance, a response time, a non-fluency level associated with the voice utterance, and a speech quality of the voice utterance.

5. The method of claim 2, wherein the target physical condition is an altered physical condition and wherein in the first network node determining whether a user has a target physical condition further comprises the substeps:
   comparing speech units in the voice utterance with corresponding baseline speech units from the user assuming that the user does not have the altered physical condition;
   comparing speech units in the voice utterance with corresponding baseline speech units from the user assuming that the speaker has the altered physical condition; and
   based on the comparative results of the two comparing steps determining a level of confidence that the user has or does not have the altered physical condition.

6. The method of claim 1, wherein in the first network node determining whether a user has a target physical condition further determines whether the user has the target physical condition based on analysis of the user's breath.

7. The method of claim 1, further comprising:
   the first network node instructing the communication device to reconfigure a parameter;
   the communication device reconfiguring the parameter, wherein the parameter reconfigured is at least one of disabling one or more pre-selected telephone numbers, changing a size of a character font displayed by the communication device, changing a contrast between a background and icons/characters displayed by the communication device, enabling selected button tones of the communication device, changing loudness of a speaker of the communication device to permit the altered user to hear button tones caused by pressing a selected button of the communication device, enabling or disabling a feature/operation of the communication device, re-ordering a list of speed-dials or contacts associated with the user, changing a speech recognition algorithm for voice commands, enabling an additional prompt when sending a text message, inserting a time delay when sending a text message, and sending automatically a text message to a drafts folder instead of sending the message to the requested destination.

8. The method of claim 1, wherein the first network node reconfigured in accordance with a first set of rules when a first degree of severity of the target physical condition is detected and in accordance with a second set of rules when a second lesser degree of severity of the target physical condition is detected and wherein the first and second sets of rules are different.

9. A communication device, comprising:
   a memory;
   a graphical user interface;
   a processor in communication with the memory and the graphical user interface, the processor configured to execute a user diagnostic functionality, the user diagnostic functionality operable to:
   determine whether a user likely has a target physical condition based upon analysis of a voice utterance;
   determine a severity of the target physical condition, wherein the target physical condition is a temporally limited altered condition of the user; and
   based on the severity of the target physical condition, configure the graphical user interface to allow the user to interface with the communication device while in the temporally limited altered condition;
   wherein determining whether a user likely has a target physical condition comprises determining a level of confidence that the user has the temporally limited altered condition;
   wherein if the level of confidence is above a first threshold, configuring the graphical user interface according to a first set of rules;
   wherein if the level of confidence is above a second threshold higher than the first threshold, configuring the graphical user interface according to a second set of rules;
   wherein if the level of confidence is below the first threshold, configuring the graphical user interface according to a third set of rules; and
   wherein each of the third set of rules, first set of rules and second set of rules are each distinct and feature increasing levels of adjustments respectively.

10. The communication device of claim 9, wherein the communication device is reconfigured, wherein the determination operation comprises the sub-operation of analyzing a voice utterance of the user, wherein the communication device effects communication between the user and another party, wherein the voice utterance is received during a live voice communication between the user and another party, and wherein the target physical condition is an altered mental state due to ingestion of alcohol or a drug.

11. The communication device of claim 10, wherein the operation to determine whether the user likely has a target physical condition comprises the sub-operation:
   performing acoustic-phonetic analysis of the voice utterance to determine a likelihood that the user has the target physical condition or a likely severity of the target physical condition.

12. The communication device of claim 11, wherein the acoustic-phonetic analysis analyzes, with reference to a baseline utterance of the speaker, at least one of a formant of the voice utterance, a pitch of the voice utterance, a speech or articulation rate of the voice utterance, a vocal intensity of the voice utterance, a number of speech errors in the voice utterance, a response time, a nonfluency level associated with the voice utterance, and a speech quality of the voice utterance.

13. The communication device of claim 10, wherein the operation to determine whether the user likely has a target physical condition comprises the sub-operations:
   comparing speech units in the voice utterance with corresponding baseline speech units from the user assuming that the user does not have the target physical condition;
   comparing speech units in the voice utterance with corresponding baseline speech units from the user assuming that the user has the target physical condition; and
   based on the comparative results of the two sub-operations determining a level of confidence that the user has or does not have the target physical condition.

14. The communication device of claim 9, wherein the operation to determine whether the user likely has a target physical condition determines whether the user has the target physical condition based on analysis of the user's breath, wherein the network node other than the communication device is reconfigured, and wherein the reconfiguration is redirecting or delaying selected incoming or outgoing contacts.

15. The communication device of claim 9, wherein the user diagnostic functionality is operable to change at least one parameter, wherein the parameter is at least one of disabling one or more pre-selected telephone numbers from selection on a graphical user interface, changing a size of a character font displayed by the communication device, changing a contrast between a background and icons/characters displayed by the communication device, enabling selected button tones of the communication device, changing loudness of a speaker of the communication device to permit the altered user to hear button tones caused by pressing a selected button of the communication device, enabling or disabling a display feature/operation of the communication device, re-ordering a displayed list of speed-dials or contacts associated with the user, changing a speech recognition algorithm for voice commands, enabling an additional prompt when sending a text message of the user, inserting and displaying a time delay when sending a text message of the user, and displaying and sending automatically a text message input by the user to a drafts folder instead of sending the message to the requested destination.

16. The communication device of claim 9, wherein the communication device is reconfigured in accordance with a first set of rules when a first degree of severity of the target physical condition is detected and in accordance with a second set of rules when a second lesser degree of severity of the target physical condition is detected and wherein the first and second sets of rules are different.

17. The communication device of claim 14, wherein the parameter reconfigured is at least one of disabling one or more pre-selected telephone numbers, re-ordering a list of speed-dials or contacts associated with the user, and enabling an additional prompt when sending a text message of the user.

18. The communication device of claim 14, wherein the parameter reconfigured is at least one of changing a size of the displayed character font, changing the contrast between the displayed background and the icons/characters, enabling button tones of the communication device, changing speaker loudness of the communication device, and changing a speech recognition algorithm for voice commands.

19. A method, comprising:
   receiving, by a network node, wherein the network node comprises a memory and a processor, a speech unit from a user from a user's communication device;
   analyzing, by the network node, the speech unit to determine whether the user has an altered physical condition, the analysis being based on a comparison of the speech unit against an speech unit spoken by the user when in a normal unaltered state;

determining a level of confidence that the user has the altered physical condition;

wherein if the level of confidence is above a first threshold, configuring the communication device according to a first set of rules;

wherein if the level of confidence is above a second threshold higher than the first threshold, configuring the communication device according to a second set of rules;

wherein if the level of confidence is below the first, configuring the communication device according to a third set of rules; and wherein the third set of rules, first set of rules, and second set of rules are each distinct, and feature increasing levels of adjustments respectively.

20. The method of claim 19, wherein the speech unit is received during a live voice conversation with a second party and wherein the method further comprises:

when the analysis indicates that the user is in the altered physical condition, notifying, by the network node, a third party that the user may be in the altered physical condition.

* * * * *

UNITED STATES PATENT AND TRADEMARK OFFICE
CERTIFICATE OF CORRECTION

| | | |
|---|---|---|
| PATENT NO. | : 7,962,342 B1 | Page 1 of 1 |
| APPLICATION NO. | : 11/508442 | |
| DATED | : June 14, 2011 | |
| INVENTOR(S) | : Marc Coughlan et al. | |

It is certified that error appears in the above-identified patent and that said Letters Patent is hereby corrected as shown below:

At Column 14, line 64 after "first network node" insert --is-- therein.

Signed and Sealed this
Twenty-ninth Day of May, 2012

David J. Kappos
*Director of the United States Patent and Trademark Office*